US012730551B2

(12) United States Patent
Gitter et al.

(10) Patent No.: US 12,730,551 B2
(45) Date of Patent: Sep. 8, 2026

(54) SYSTEMS AND METHODS FOR LAUNCHING AND REPLACING APPLICATIONS

(71) Applicant: Apple Inc., Cupertino, CA (US)

(72) Inventors: Nathan Gitter, Cupertino, CA (US); Aaron M. Burns, Sunnyvale, CA (US); Benjamin Hylak, San Francisco, CA (US); Jonathan R. Dascola, San Francisco, CA (US); Alexis H. Palangie, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 44 days.

(21) Appl. No.: 18/269,224

(22) PCT Filed: Dec. 21, 2021

(86) PCT No.: PCT/US2021/064737
§ 371 (c)(1),
(2) Date: Jun. 22, 2023

(87) PCT Pub. No.: WO2022/140473
PCT Pub. Date: Jun. 30, 2022

(65) Prior Publication Data

US 2024/0045579 A1 Feb. 8, 2024

Related U.S. Application Data

(60) Provisional application No. 63/129,495, filed on Dec. 22, 2020.

(51) Int. Cl.

| | |
|---|---|
| ***G06F 3/0482*** | (2013.01) |
| ***G06F 3/04815*** | (2022.01) |
| ***G06F 3/04842*** | (2022.01) |

(52) U.S. Cl.
CPC ...... *G06F 3/04842* (2013.01); *G06F 3/04815* (2013.01)

(58) Field of Classification Search
CPC .. G06F 3/048; G06F 3/04815; G06F 3/04886; G06F 3/017; G06F 3/0481
(Continued)

(56) References Cited

U.S. PATENT DOCUMENTS

| | | | | |
|---|---|---|---|---|
| 6,577,330 B1 * | 6/2003 | Tsuda | G09G 5/14 | 715/781 |
| 6,710,788 B1 * | 3/2004 | Freach | G06F 3/0481 | 715/782 |

(Continued)

FOREIGN PATENT DOCUMENTS

| | | |
|---|---|---|
| CN | 104053036 A | 9/2014 |
| WO | 2017027526 A1 | 2/2017 |

OTHER PUBLICATIONS

Pfeuffer, K., et al. "Gaze + Pinch Interaction in Virtual Reality," Proceedings of SUI '17, Oct. 16-17, 2017, 10 pages.

(Continued)

*Primary Examiner* — Patrick F Riegler
(74) *Attorney, Agent, or Firm* — Kubota & Basol LLP

(57) ABSTRACT

A representation displayed in a three-dimensional environment may be selected with different types of selection inputs. When a representation displayed in the three-dimensional environment is selected, an application corresponding to the representation may be launched in the three-dimensional environment in accordance with the type of selection received. In such embodiments, when the representation is selected with a first type of selection, the application corresponding to the selected representation may be launched in a first manner, and when the representation is selected with a second type of selection, the application corresponding to the selected representation may be launched in a second (Continued)

manner. In some embodiments, the manner in which the application is launched may determine whether one or more previously launched applications continue to be displayed or cease to be displayed in the three-dimensional environment.

29 Claims, 9 Drawing Sheets

(58) Field of Classification Search
USPC .......................................................... 715/782
See application file for complete search history.

(56) References Cited

U.S. PATENT DOCUMENTS 9,116,594 B2* 8/2015 Hwang ............... G06F 3/04845
9,207,838 B2* 12/2015 Khoe .................... G06F 3/0481
9,377,863 B2 6/2016 Bychkov et al.
9,791,994 B2* 10/2017 Hynes ................... G06F 3/0481
11,422,678 B2* 8/2022 Kim ...................... G06F 3/0483
12,039,162 B2* 7/2024 Xu ...................... G06F 3/04883
2005/0010876 A1* 1/2005 Robertson ........... G06F 3/04815 715/781
2007/0070066 A1* 3/2007 Bakhash ............. G06F 3/04845 345/419
2008/0034317 A1* 2/2008 Fard ........................ G06T 13/80 715/781
2012/0084681 A1* 4/2012 Cassar .................... G06F 3/048 715/761
2012/0131495 A1* 5/2012 Goossens .............. G06F 3/0482 715/781
2014/0096051 A1* 4/2014 Boblett ................... G06F 17/00 715/769
2014/0253801 A1* 9/2014 Richman ............ H04N 21/4312 348/564
2014/0283142 A1* 9/2014 Shepherd ............ G06F 3/04817 726/30
2014/0310642 A1 10/2014 Vranjes et al.
2014/0351722 A1* 11/2014 Frederickson ........ G06F 3/0481 715/761
2015/0365306 A1 12/2015 Chaudhri et al.
2017/0046025 A1 2/2017 Dascola et al.
2017/0371523 A1* 12/2017 Liao .................... G06F 3/04815
2018/0121028 A1* 5/2018 Kuscher .............. G06F 3/04845
2019/0012008 A1* 1/2019 Yoon ..................... G06F 1/1652
2019/0073109 A1* 3/2019 Zhang ..................... G06F 3/013
2019/0197785 A1* 6/2019 Tate-Gans ............. G06T 19/006
2019/0212827 A1 7/2019 Kin et al.
2019/0362557 A1* 11/2019 Lacey ....................... G06T 5/20
2019/0384460 A1* 12/2019 Harnisch ................. G06F 9/453
2021/0275899 A1* 9/2021 Hyodo .................... G06F 9/451
2022/0291794 A1* 9/2022 Bian ................... G06F 3/04817
2022/0342682 A1* 10/2022 Ni ....................... G06F 3/04883
2023/0127743 A1* 4/2023 Mo ......................... G06F 9/451 715/788
2023/0259272 A1* 8/2023 Xu ........................ G06F 3/0481 345/173

OTHER PUBLICATIONS

Search Report received for Chinese Patent Application No. 202180086431.2, mailed on May 22, 2026, 5 pages (3 pages of English Translation and 2 pages of Official Copy).

* cited by examiner 102
104A
106
104B
100

SYSTEMS AND METHODS FOR LAUNCHING AND REPLACING APPLICATIONS

CROSS-REFERENCE TO RELATED APPLICATIONS

This application is a National Phase application under 35 U.S.C. § 371 of International Application No. PCT/US2021/064737, filed Dec. 21, 2021, which claims the priority benefit of U.S. Provisional Application No. 63/129,495, filed Dec. 22, 2020, the contents of which are hereby incorporated by reference in their entireties for all intended purposes.

FIELD OF THE DISCLOSURE

This relates generally to systems and methods for launching and/or replacing applications in a computer-generated environment.

BACKGROUND OF THE DISCLOSURE

Computer-generated environments are environments where at least some objects displayed for a user's viewing are generated using a computer. Users may interact with a computer-generated environment, such as by launching and/or replacing user interfaces of applications.

SUMMARY OF THE DISCLOSURE

In some embodiments, a representation (e.g., a user interface element such as an icon) displayed in a three-dimensional environment may be selected with different types of selection inputs. When the representation displayed in the three-dimensional environment is selected, an application corresponding to the selected representation may be launched in the three-dimensional environment in accordance with the type of selection received. In some such embodiments, when the representation is selected with a first type of selection, the application corresponding to the selected representation may be launched in a first manner, and when the representation is selected with a second type of selection, the application corresponding to the selected representation may be launched in a second manner. In some embodiments, the manner in which the application is launched may determine whether one or more previously launched applications continue being displayed or cease being displayed in the three-dimensional environment. It is understood that this Summary does not limit the scope of the disclosure in any way. Additional descriptions of the embodiments of this disclosure are provided in the Drawings and the Detailed Description that follow.

BRIEF DESCRIPTION OF THE DRAWINGS

For a better understanding of the various described embodiments, reference should be made to the Detailed Description below, in conjunction with the following drawings in which like reference numerals often refer to corresponding parts throughout the figures.

DETAILED DESCRIPTION

Figure 1A:
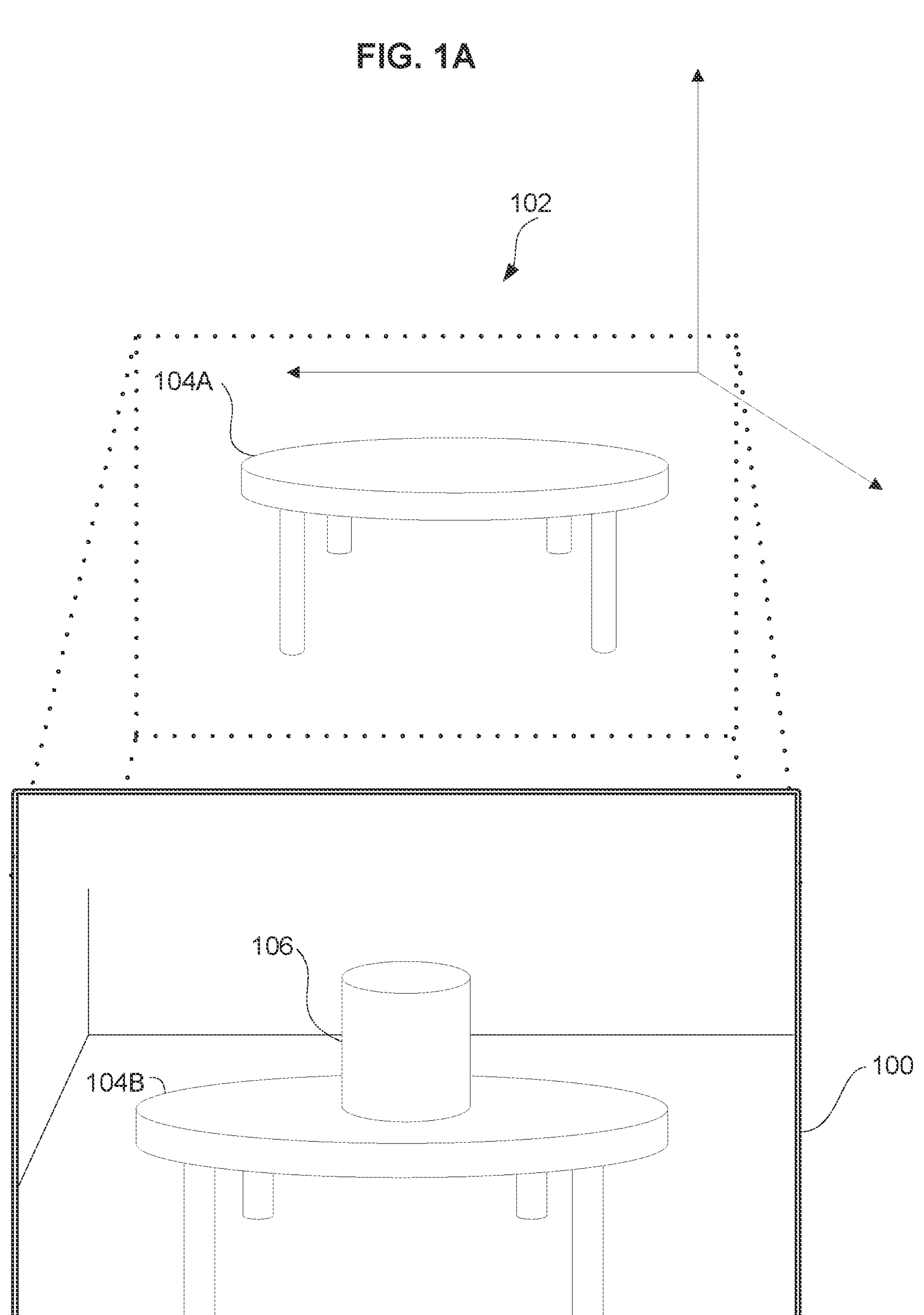
FIG. 1A illustrates an electronic device displaying a computer-generated environment according to some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. An XR environment is often referred to herein as a computer-generated environment. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as μLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

As will be described in further detail below, in some embodiments, a representation (e.g., a user interface element such as an icon) displayed in a three-dimensional environment may be selected with different types of selection inputs. When the representation displayed in the three-dimensional environment is selected, an application corresponding to the selected representation may be launched in the three-dimensional environment in accordance with the type of selection received. In some such embodiments, when the representation is selected with a first type of selection, the application corresponding to the selected representation may be launched in a first manner, and when the representation is selected with a second type of selection, the application corresponding to the selected representation may be launched in a second manner. In some embodiments, the manner in which the application is launched may determine whether one or more previously launched applications continue being displayed or cease being displayed in the three-dimensional environment.

As described herein, ceasing displaying of an application in a three-dimensional environment can refer to removing the application from the three-dimensional environment rather than occluding view of the application from a particular perspective in the three-dimensional environment. For example, unlike an occluded application which may be visible to a user in the three-dimensional space if the user changes perspective (e.g., navigate in the three-dimensional environment around the occluding object), ceasing to display the application may remove the application from view in the three-dimensional environment so that it is not visible until relaunched (or otherwise re-invoked). In some embodiments, ceasing to display an application can additionally terminate execution of the application. Further details of launching an application in a three-dimensional environment is described with respect to FIGS. 2-8.

FIG. 1A illustrates an electronic device 100 displaying a computer-generated environment (e.g., an extended reality (XR) environment) according to some embodiments of the disclosure. In some embodiments, electronic device 100 is a hand-held or mobile device, such as a tablet computer, laptop computer, smartphone, a wearable device, or head-mounted display. Examples of device 100 are described below with reference to the architecture block diagram of FIG. 1B. As shown in FIG. 1A, electronic device 100 and table 104A are located in the physical environment 102 (e.g., also referred to as "real-world environment" that people can directly sense and/or interact with without the aid of electronic systems). In some embodiments, electronic device 100 may be configured to capture areas of physical environment 102 including table 104A (illustrated in the field of view of electronic device 100). In some embodiments, in response to a trigger, the electronic device 100 may be configured to display an object 106 in the computer-generated environment (e.g., represented by a cylinder illustrated in FIG. 1A) that is not present in the physical environment 102 (e.g., a virtual object), but is displayed in the computer generated environment positioned on (e.g., anchored to) the top of a computer-generated representation 104B of real-world table 104A. For example, object 106 can be displayed on the surface of the computer-generated representation 104B of table 104A in the computer-generated environment displayed via device 100 in response to detecting the planar surface of table 104A in the physical environment 102. It should be understood that object 106 is a representative object and one or more different objects (e.g., of various dimensionality such as two-dimensional or three-dimensional objects) can be included and rendered in a three-dimensional computer-generated environment. For example, the object 106 can represent an application or a user interface displayed in the computer-generated environment. In some embodiments, the application or user interface can include the display of selectable options for launching applications or for performing operations associated with applications. Additionally, it should be understood, that the three-dimensional (3D) environment (or 3D object) described herein may be a representation of a 3D environment (or three-dimensional object) displayed in a two dimensional (2D) context (e.g., displayed on a 2D screen).

Figure 1B:
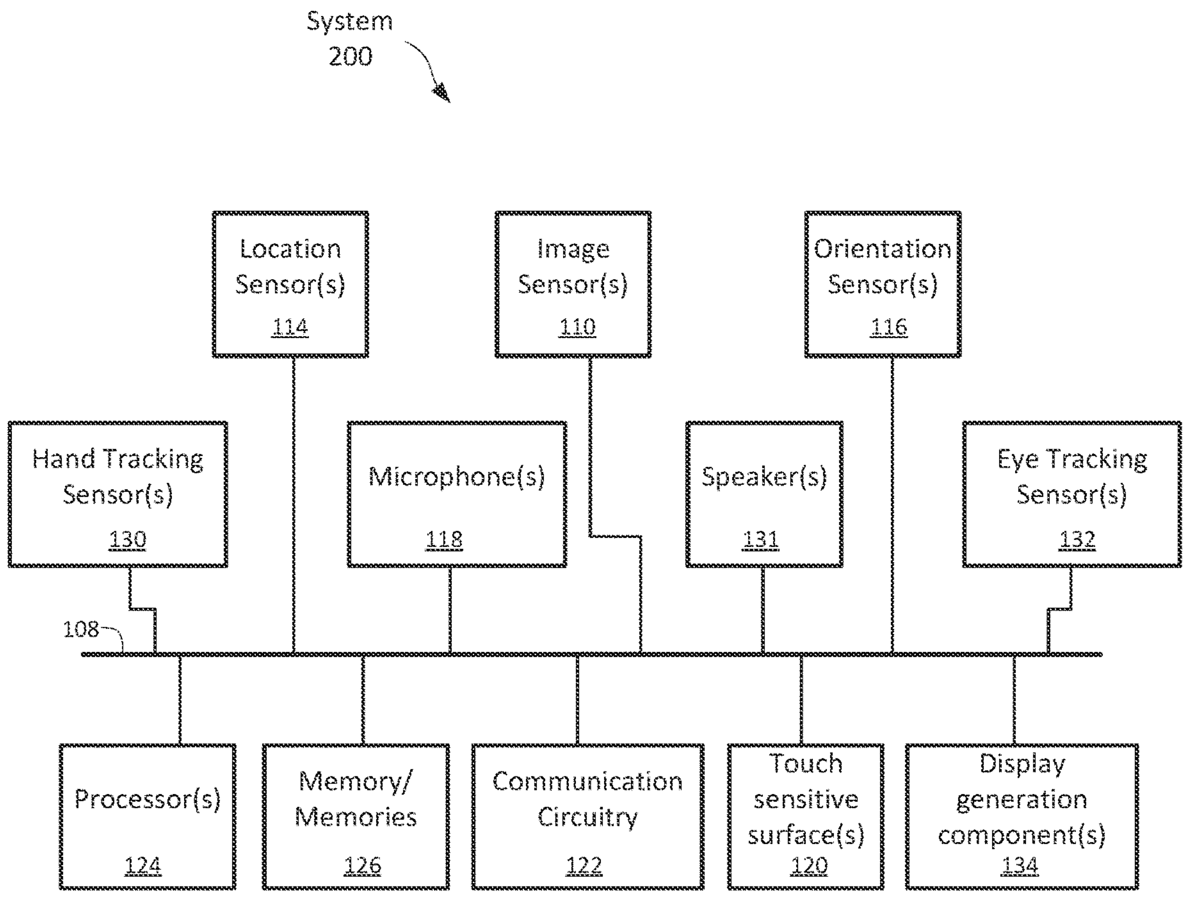
FIG. 1B illustrates a block diagram of an exemplary architecture for a system or device according to some embodiments of the disclosure.

FIG. 1B illustrates a block diagram of an exemplary architecture for a system or device 100 in accordance with some embodiments of the disclosure. In some embodiments, device 100 may be a mobile device, such as a mobile phone (e.g., smart phone), a tablet computer, a laptop computer, a desktop computer, a head-mounted display, television, an auxiliary device in communication with another device, etc. In some embodiments, as illustrated in FIG. 1B, device 100 may include various components such as communication circuitry 122, processor(s) 124, memory 126, image sensor (s) 110, orientation sensor(s) 116, microphone(s) 118, touch sensitive surface(s) 120, eye tracking sensor(s) 132, location sensor(s) 114, hand tracking sensor(s) 130, speaker(s) 131, and/or display generation component(s) 134. These components optionally communicate over communication bus(es) 108 of device 100.

Communication circuitry 122 may optionally include circuitry for communicating with electronic devices, networks, such as the Internet, intranets, a wired network and/or a wireless network, cellular networks and wireless local area networks (LANs). Communication circuitry 122 may also include circuitry for communicating using near-field communication (NFC) and/or short-range communication, such as Bluetooth®.

Processor(s) 124 may include one or more general purpose processors, one or more graphics processors, and/or one or more digital signal processors. In some embodiments, memory 126 may be a non-transitory computer-readable storage medium (e.g., flash memory, random access memory, or other volatile or non-volatile memory or storage) that stores computer-readable instructions configured to be executed by processor(s) 124 to perform the techniques, processes, and/or methods described below. In some embodiments, memory 126 may include more than one non-transitory computer-readable storage medium. A non-transitory computer-readable storage medium may be any medium (e.g., excluding a signal) that can tangibly contain or store computer-executable instructions for use by or in connection with the instruction execution system, apparatus, or device. In some embodiments, the storage medium may be a transitory computer-readable storage medium. In some embodiments, the storage medium may be a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Display generation component(s) 134 optionally includes a single display (e.g., a liquid-crystal display (LCD), a display using organic light-emitting diode (OLED), micro-LEDs, digital light projection, liquid crystal on silicon, laser scanning light source, or other types of display or a display using a combination of these technologies). In some embodiments, display generation component(s) 134 may include multiple displays. In some embodiments, display generation component(s) 134 may include a display with touch capability (e.g., a touch screen), a projector, a holographic projector, a retinal projector, etc. In some embodiments, display generation component 134 may be an opaque display (e.g., excluding the displayed image and optionally using video pass through to capture the physical environment). In some embodiments, display generation component 134 is a transparent or translucent display, optionally having a medium through which light representative of images is directed to a person's eyes. The medium may be an optical waveguide, a hologram medium, an optical combiner, an optical reflector, or any combination thereof. In one embodiment, the transparent or translucent display may be configured to become opaque (e.g., the opacity of the medium may be controlled). In some embodiments, the medium may include glass or plastic of a window, windshield, or lenses).

In some embodiments, device 100 may include touch-sensitive surface(s) 120 for receiving user inputs, such as tap inputs and swipe inputs or other gestures. In some embodiments, display generation component(s) 134 and touch-sensitive surface(s) 120 may form touch-sensitive display(s) (e.g., a touch screen integrated with device 100 or external to device 100 that is in communication with device 100).

Image sensors(s) 110 optionally include one or more visible light image sensor, such as charged coupled device (CCD) sensors, and/or complementary metal-oxide-semiconductor (CMOS) sensors operable to obtain images of physical objects from the real-world environment. Image sensor(s) 110 may also include one or more infrared (IR) sensors, such as a passive or an active IR sensor, for detecting infrared light from the real-world environment. For example, an active IR sensor includes an IR emitter for emitting infrared light into the real-world environment. Image sensor(s) 110 may also include one or more cameras configured to capture movement of physical objects in the real-world environment. Image sensor(s) 110 may also include one or more depth sensors configured to detect the distance of physical objects from device 100. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 100 may use CCD sensors, event cameras, and depth sensors in combination to detect the physical environment around device 100. In some embodiments, image sensor(s) 110 may include a first image sensor and a second image sensor. The first image sensor and the second image sensor may work in tandem and are optionally configured to capture different information of physical objects in the real-world environment. In some embodiments, the first image sensor may be a visible light image sensor and the second image sensor may be a depth sensor. In some embodiments, device 100 may use image sensor(s) 110 to detect the position and orientation of device 100 and/or display generation component(s) 134 in the real-world environment. For example, device 100 may use image sensor(s) 110 to track the position and orientation of display generation component(s) 134 relative to one or more fixed objects in the real-world environment.

In some embodiments, device 100 optionally includes hand tracking sensor(s) 130 and/or eye tracking sensor(s) 132, in some embodiments. Hand tracking sensor(s) 130 may be configured to track the position/location of one or more portions of the user's hands, the orientation of one or more portions of the user's hands, and/or motions of one or more portions of the user's hands with respect to the extended reality environment, relative to the display generation component(s) 134, and/or relative to another defined coordinate system. Eye tracking sensor(s) 132 may be configured to track the position and movement of a user's gaze (eyes, face, or head, more generally) with respect to the real-world or extended reality environment and/or relative to the display generation component(s) 134. In some embodiments, hand tracking sensor(s) 130 and/or eye tracking sensor(s) 132 may be implemented together with the display generation component(s) 134. In some embodiments, the hand tracking sensor(s) 130 and/or eye tracking sensor(s) 132 may be implemented separate from the display generation component(s) 134.

In some embodiments, the hand tracking sensor(s) 130 may use image sensor(s) 110 (e.g., one or more IR cameras, 3D cameras, depth cameras, etc.) to capture three-dimensional information from the real-world including one or more hands (e.g., of a human user). In some embodiments, the hands may be resolved with sufficient resolution to distinguish fingers and their respective positions. In some embodiments, one or more image sensor(s) 110 may be positioned relative to the user to define a field of view of the image sensor(s) and an interaction space in which finger/hand position, orientation and/or movement captured by the image sensors may be used as inputs (e.g., to distinguish from a user's resting hand or other hands of other persons in the real-world environment). Tracking the fingers/hands for input (e.g., gestures) may be advantageous in that it does not require the user to touch, hold or wear any sort of beacon, sensor, or other marker.

In some embodiments, eye tracking sensor(s) 132 may include at least one eye tracking camera (e.g., infrared (IR) cameras) and/or illumination sources (e.g., IR light sources, such as LEDs) that emits light towards a user's eyes. The eye tracking cameras may be pointed towards a user's eyes to receive reflected IR light from the light sources directly or indirectly from the eyes. In some embodiments, both eyes may be tracked separately by respective eye tracking cameras and illumination sources, and a focus/gaze may be determined from tracking both eyes. In some embodiments, one eye (e.g., a dominant eye) may be tracked by a respective eye tracking camera/illumination source(s).

Device 100 optionally includes microphones(s) 118 or other audio sensors. Device 100 may use microphone(s) 118 to detect sound from the user and/or the real-world environment of the user. In some embodiments, microphone(s) 118 may include an array of microphones (a plurality of microphones) that optionally operate in tandem, such as to identify ambient noise or to locate the source of sound in space of the real-world environment. In some embodiments audio/voice inputs can be used to interact with the user interface or computer-generated environment captured by microphone(s) 118.

Device 100 optionally includes location sensor(s) 114 for detecting a location of device 100 and/or display generation component(s) 134. For example, location sensor(s) 114 may include a GPS receiver that receives data from one or more satellites and allows device 100 to determine the device's absolute position in the physical world.

Device 100 optionally includes orientation sensor(s) 116 for detecting orientation and/or movement of device 100 and/or display generation component(s) 134. For example, device 100 may use orientation sensor(s) 116 to track changes in the position and/or orientation of device 100 and/or display generation component(s) 134, such as with respect to physical objects in the real-world environment. Orientation sensor(s) 116 may include one or more gyroscopes and/or one or more accelerometers.

It is understood that the architecture of device 100 in FIG. 1B is an example architecture, but that system/device 100 is not limited to the components and configuration of FIG. 1B. For example, the device/system can include fewer, additional, or other components in the same or different configurations. In some embodiments, information displayed on the electronic device or by the electronic device is optionally used to describe information output by the electronic device for display on a separate display device. In some embodiments, input received on the electronic device (e.g., touch input received on a touch-sensitive surface of the electronic device) is optionally used to describe input received on a separate input device, from which the electronic device receives input information.

Device 100 typically supports a variety of applications that may be displayed in the computer-generated environment, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a content application (e.g., a photo/video management application), a digital camera application, a digital video camera application, a web browsing application, a digital music player application, a television channel browsing application, and/or a digital video player application.

In some embodiments, a person using device 100 (optionally referred to herein as a user of the device) can launch one or more applications. In some embodiments, applications can be launched using a representation of the application (e.g., a user interface element such as an icon). When a representation displayed in the three-dimensional environment is selected, an application corresponding to the selected representation may be launched in the three-dimensional environment in accordance with the type of selection received.

Figure 2:
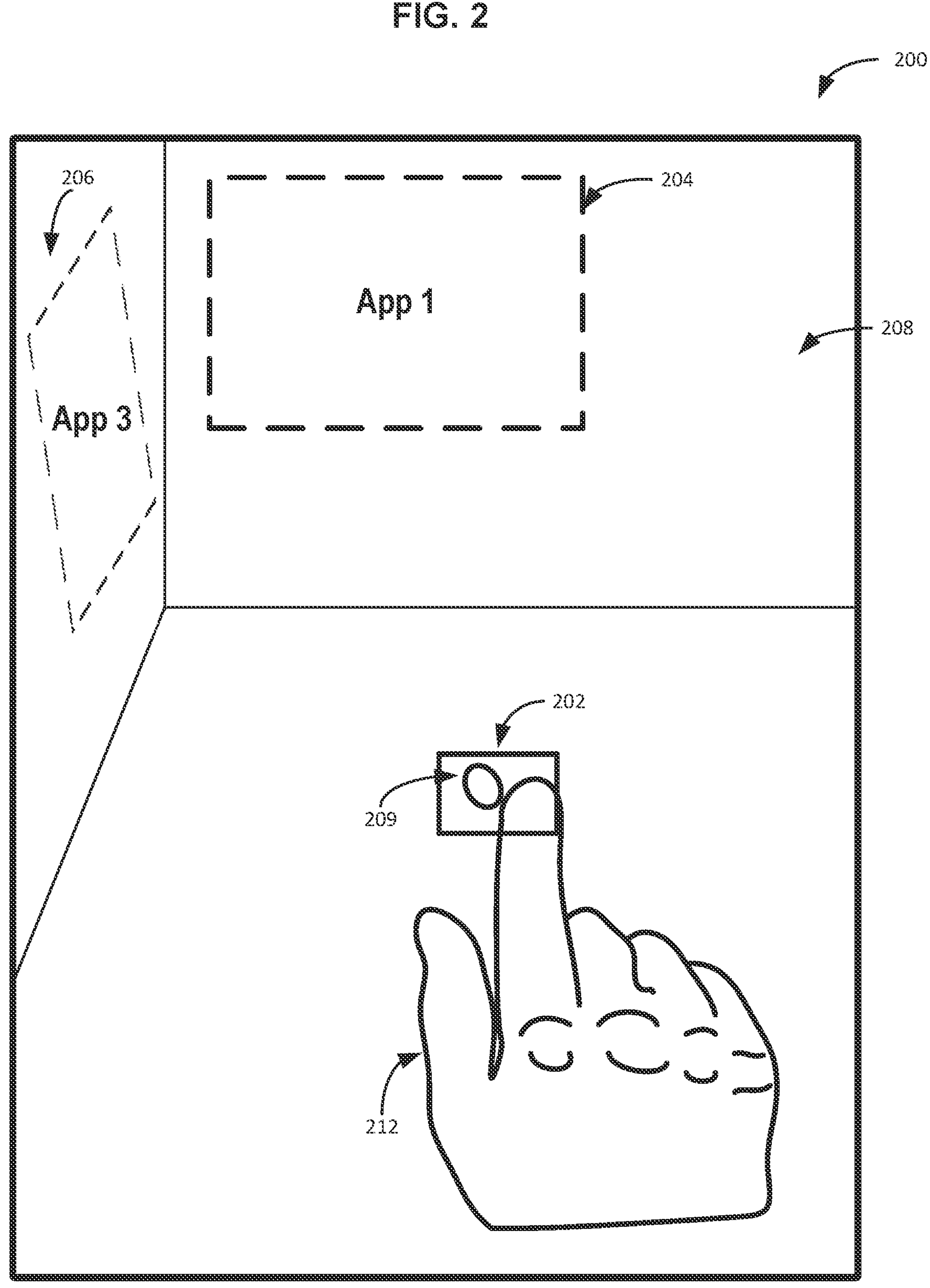
FIG. 2 illustrates selecting a representation of an application for launch in a three-dimensional environment according to some embodiments of the disclosure.

FIG. 2 illustrates selecting a representation of an application for launch in a three-dimensional environment according to embodiments of the disclosure. In FIG. 2, the three-dimensional environment 200 may be displayed by an electronic device (e.g., an electronic device similar to device 100) or may be displayed by a display generation component (e.g., a display device) that is in communication with the electronic device (e.g., integrated with or external to the device), such as a monitor, a touch screen, a projector, a television, a head-mounted display, etc.

The three-dimensional environment 200 may include a representation 202 (e.g., a user interface element such as an icon) that is selectable to launch a respective application corresponding to representation 202. Although one representation 202 is shown in FIG. 2, it is understood that the three-dimensional environment 200 can include additional representations that are each selectable to launch respective applications. Additionally, three-dimensional environment 200 may include one or more previously launched applications (e.g., application 204 and application 206).

In some embodiments, the one or more representations and the one or more previously launched applications may be displayed floating in three-dimensional environment 200. In some embodiments, the one or more representations and the one or more previously launched applications may be displayed overlaid over surfaces in the physical (or virtual) environment, such as overlaid on a planar surface of wall 208 in the rear of three-dimensional environment 200. In some embodiments, the one or more representations and the one or more previously launched applications may also be displayed above, beneath, to the side and/or in proximity of physical (or virtual) objects, such as tables (e.g., table 121), chairs, doors, etc. (not shown).

Applications 204 and/or 206 in the three-dimensional environment are applications that have been previously launched and a user may interact with these applications without needing to launch the previously launched application. In some embodiments, applications 204 and/or 206 were launched in response to previous selection input(s) (e.g., directed to the representation(s) corresponding to applications 204 and/or 206). In some embodiments, applications 204 and/or 206 were automatically launched without user input. In some embodiments, application 204 and application 206 may include a messaging application, an electronic mail application, a web browser application, a music application, a video application, a social media application, a fitness application, a gaming application, or the like.

In some embodiments, a new application can be launched using a selection input targeting representation 202. In some embodiments, the selection input is received using one or more of the input device(s) of the electronic device (e.g., image sensors 110, location sensors 114, orientation sensors 116, microphones 118, touch and/or proximity sensitive sensors, proximity and/or touch sensitive surface(s) 120, hand tracking sensors 130, eye tracking sensors 132, etc.). In some embodiments, when no previously launched applications are displayed in the three-dimensional environment 200, the electronic device may launch the application corresponding to the representation targeted by the selection input. In some embodiments, the selection input may be received while displaying one or more previously launched applications, including a first application (e.g., application 204) in the three-dimensional environment 200, and optionally displaying a third application (e.g., application 206). The launch of the application corresponding to the representation targeted by the selection may depend on the type of selection input. For example, the electronic device may be configured to receive different types of selection inputs directed to the displayed representations. In some such embodiments, in accordance with a determination that the received selection input is a first type of selection input, the application corresponding to the respective representation is launched in the three-dimensional environment in a first manner, and in accordance with a determination that the received selection input in a second type of selection input, different than the first type of selection input, the application corresponding to the respective representation is launched in the three-dimensional environment in a second manner, different from the first manner. In some embodiments, the manner of launch may determine whether one or more previously launched applications (e.g., applications 204 and/or 206) are maintained in the display or ceased to be displayed in the three-dimensional environment 200.

In some embodiments, a selection input targeting representation 202 may correspond to a hand 212 performing a hand gesture, such as a tapping gesture with a finger, a pinching gesture for less than a threshold amount of time (e.g., a pinch and release after holding the pinch for less than the threshold amount), a pinching gesture for greater than a threshold amount of time (e.g., a pinch and release after holding the pinching for greater than the threshold amount), and the like. In some embodiments, the selection input may target representation 202 by bringing hand 212 or a representation of hand 212 in contact with or proximity to representation 202 as represented by target 209. For example, representation 202 may be targeted by a finger or a representation of a finger of hand 212 tapping representation 202 at or near the location of target 209 or by two fingers or a representation of two fingers of hand 212 pinching representation 202 at or near the location of target 209. In some embodiments, representation 202 is targeted using eye focus (gaze) and the selection input includes a selection using a button, a pinch gesture, or the like at a distance from representation 202.

Figure 3:
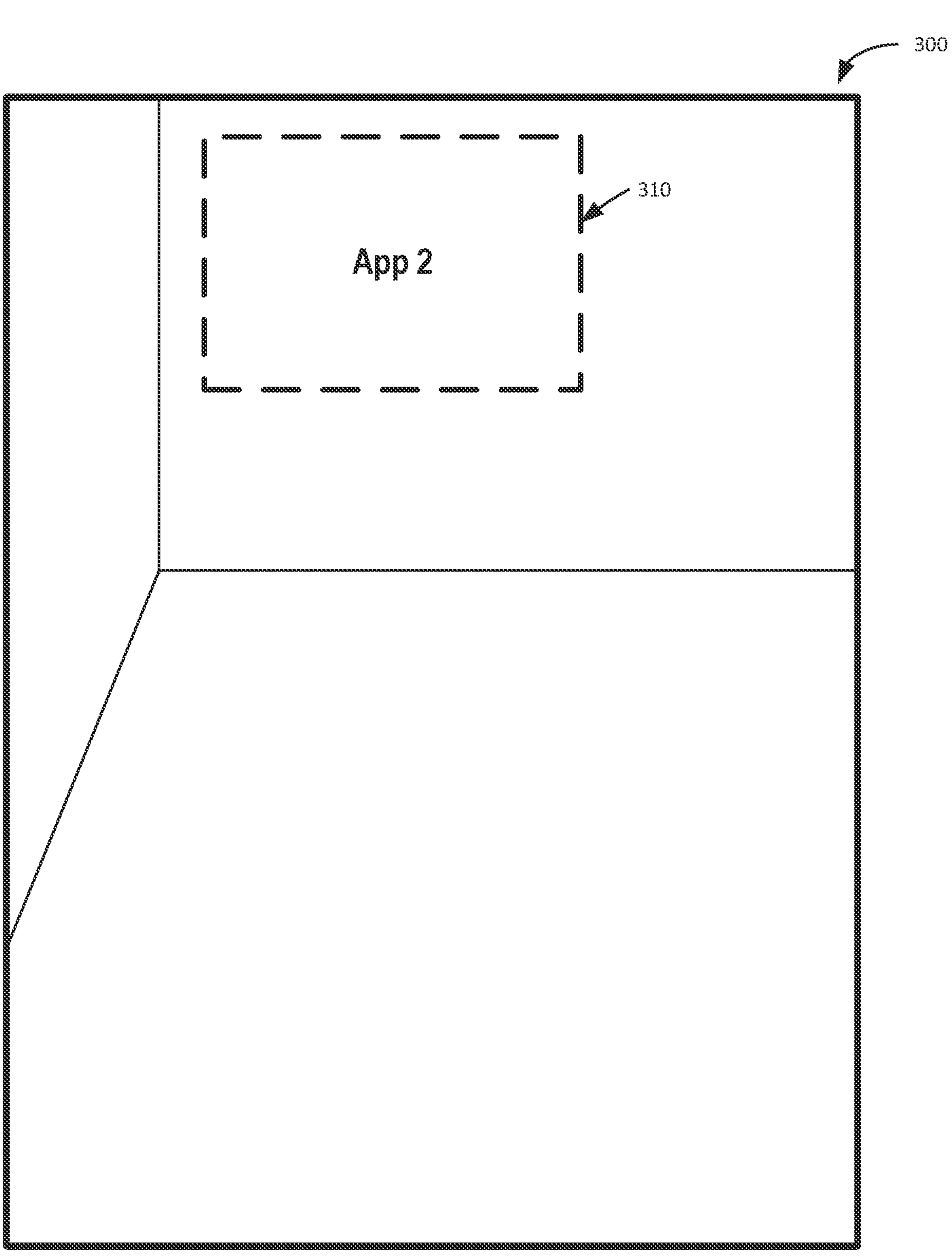
FIG. 3 illustrates launch of an application in response to receiving the selection input of a first type according to some embodiments of the disclosure.

FIG. 3 illustrates launch of an application in response to receiving the selection input of a first type according to embodiments of the disclosure. In some embodiments, the first type of selection input may correspond to a tapping gesture, button press, pinching gesture for less than a threshold period of time (e.g., using proximity or gaze for targeting), tap and hold gesture, button press and hold, pinching gesture for more than a threshold period of time, or the like. As illustrated in FIG. 3, an application 310—the application corresponding to representation 202 targeted by the first type of selection input—may be launched in the three-dimensional environment 300 (e.g., a three-dimensional environment similar to three-dimensional environment 200).

In some embodiments, when the selection input is determined to be of a first type, the application corresponding to the selected representation (e.g., application 310) may be launched in the three-dimensional environment and one or more previously launched applications (e.g., applications such as applications 204 and/or 206) may cease to be displayed in the three-dimensional environment 300. For example, as illustrated in FIG. 3, applications 204 and 206 have ceased to be displayed in the three-dimensional environment 300. After application 310 is launched in the three-dimensional environment 300, a user may then interact with and provide input to the newly launched application. For example, if the launched application 310 is a messaging application, the input device(s) of the electronic device can receive input, via one or more input device(s) of the electronic device, directed to the respective functionality of the messaging application (e.g., sending, viewing, and composing of messages). In some embodiments, application 310 may be configured to launch at a predetermined location in the three-dimensional environment. For example, FIG. 3 illustrates launching application 310 in the background away from the user (e.g., overlaid on wall 208). In some embodiments, the predetermined location in the three-dimensional environment may be the foreground (e.g., floating or anchored to an object). In some embodiments, the application may launch in the foreground or the background depending on the three-dimensional environments (e.g., launch in the background when a wall is available, otherwise launch floating in the foreground). In some embodiments, the application 310 may be configured to launch in a user-selected location based on a user input via an input mechanism, hand gesture, gaze, voice, or the like. In some embodiments, when no previously launched applications exist in the three-dimensional environment and the selection input is determined to be of a first type, the application corresponding to the selected representation (e.g., application 310) may be launched in the three-dimensional environment as described above at the predetermined or user-selected location.

Figure 4:
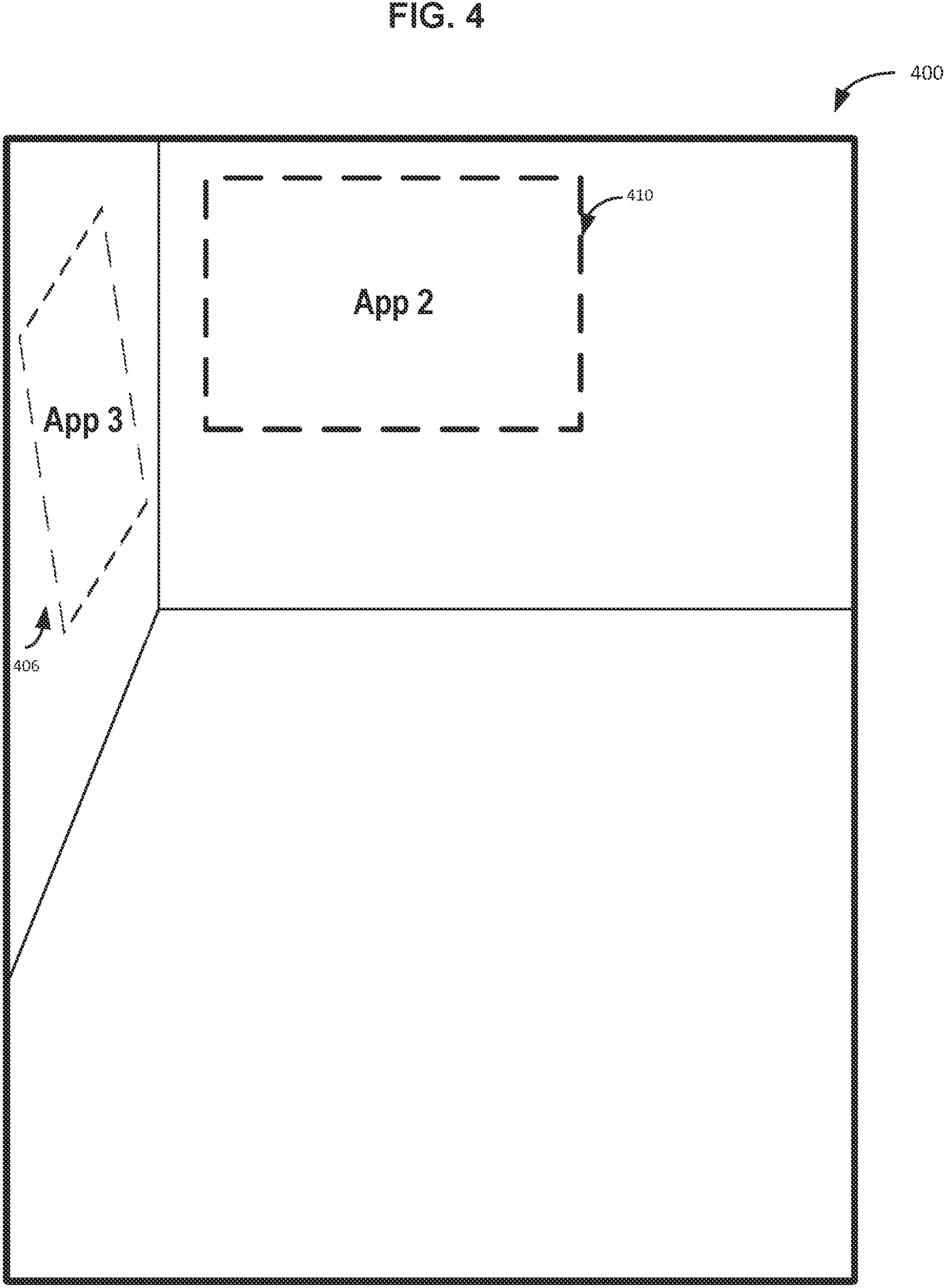
FIG. 4 illustrates launch of an application in response to receiving the selection input of a first type according to some embodiments of the disclosure.

Although FIG. 3 illustrates launch of an application 310 resulting in ceasing display of previously launched applications (e.g., applications 204 and 206), in some embodiments, when a selection input of a first type is received, some of the previously launched applications may continue to be displayed in the three-dimensional environment. FIG. 4 illustrates launch of an application in response to receiving the selection input of a first type according to embodiments of the disclosure. In some embodiments, the first type of selection input may correspond to a tapping gesture, button press, pinching gesture for less than a threshold period of time (e.g., using proximity or gaze for targeting), tap and hold gesture, button press and hold, pinching gesture for more than a threshold period of time, or the like. As illustrated in FIG. 4, an application 410—the application corresponding to representation 202 targeted by the first type of selection input—may be launched in the three-dimensional environment 400 (e.g., a three-dimensional environment similar to three-dimensional environments 200, 300).

In some embodiments, when the selection input is determined to be of a first type, the application that corresponds to the selected representation (e.g., application 410) may be launched in the three-dimensional environment and one or more previously launched applications may cease being displaying in the three-dimensional environment 400 while one or more previously launched applications may continue to be displayed. For example, as illustrated in FIG. 4, application 204 ceases being displayed in the three-dimensional environment 400 and is replaced by application 410, whereas application 406 corresponding to previously launched application 206 can continue to be displayed. After application 410 is launched in the three-dimensional environment 400, a user may then interact with and provide input to the newly launched application 410 and/or to previously launched application 406.

In some embodiments, whether a previously launch application ceases to be displayed or continues to be displayed is determined based on characteristics of the newly launch application 410. In some embodiments, a determination is made (e.g., in response to receiving a selection input of a first type) about whether the application corresponding to the representation 202 (e.g., application 410) shares one or more characteristics with and the one or more previously launched applications (e.g., applications 204 and 206). When a determination is made that the application corresponding to the selected representation (e.g., application 410 corresponding to representation 202) shares the one or more characteristics with a previously launched application displayed in the three-dimensional environment (e.g., applications 204 and 206), the application corresponding to the selected representation may be launched in the three-dimensional environment 400 and a previously launched application that shares the one or more characteristics may cease being displaying in the three-dimensional environment 400. When a determination is made that the application corresponding to the selected representation (e.g., application 410 corresponding to representation 202) does not share the one or more characteristics with a previously launched application displayed in the three-dimensional environment (e.g., applications 204 and 206), the application corresponding to the selected representation may be launched in the three-dimensional environment 400 and a previously launched application that does not share the one or more characteristics may continue being displaying in the three-dimensional environment 400.

For example, as illustrated in FIG. 4, an application that shares the one or more characteristics with the application corresponding to the selected representation (e.g., application 204 shares one or more characteristics with application 410) ceases to be displayed in the three-dimensional environment 400, whereas an application that does not share the one or more characteristic with the application corresponding to the selected representation (e.g., application 406/206 does not share the one or more characteristics with application 410) remains displayed in the three-dimensional environment 400.

In some embodiments, the one or more shared characteristics comprises a shared location within the three-dimensional environment. For example, a previously launched application may occupy a position within the three-dimensional environment corresponding to the default or preferred launch location of the application corresponding to representation 202. When the default or preferred launch location of the application corresponding to representation 202 (e.g., application 410) is at or within a threshold distance of the location of a previously launched application (or multiple previously launched applications), the previously launched application(s) with the shared location characteristic can be replaced. In contrast, when the default or preferred launch location of the application corresponding to representation 202 (e.g., application 410) is not at or within the threshold distance of the location of the previously launched application (or multiple previously launched applications), the previously launched application(s) without the shared location characteristic can be maintained. In some embodiments, the launched application (e.g., application 410) may inherent properties of the previously displayed (e.g., replaced application 204), such as location, dimensions, application-specific settings (e.g., volume), or the like, In some embodiments, some applications may have a characteristic of being a background application and other applications may have a characteristic of being foreground applications, where background and foreground relate to the relative distance between the application and the user within the three-dimensional environment For example, a background application may be more than a first threshold distance from the user in the geometry of the three-dimensional environment and a foreground application may be within a second threshold distance of the user in the geometry of the three-dimensional environment (e.g., within arm's length for direct manipulations). In some such embodiments, launching a foreground application can cause previously launched foreground applications with the common characteristic to cease being displayed, whereas background applications can remain displayed. For example, if a user is viewing a video application in the background (e.g., with the video application anchored to a back wall) while composing a message in a messaging application in the foreground, launching an internet browsing application (e.g., another foreground application) can cause the internet browsing application to replace the messaging application without disturbing display of the video application. In contrast, if the user were to launch a second video application while displaying a first video application in the background and a messaging application in the foreground, the second video application can replace the first video application (e.g., ceasing display of the first video application) while maintaining display of the messaging application.

In some embodiments, the one or more shared characteristics comprises whether the newly launched application is an anchored or free-floating application. For example, some applications may launch anchored to a planar surface, whereas some applications may launch floating without anchoring to a planar surface. In some such embodiments, previously launched applications with the same anchoring characteristic may cease being displayed whereas previously launched applications with a different anchoring characteristic may continue being displayed.

In some embodiments, the one or more shared characteristics comprises a shared application type. In some embodiments, being of a same type of application may include being in a same application category (e.g., application categories such as messaging, social networking, entertainment, health and fitness, music, travel, photo and video, sports, finance, or the like). For example, if application 204 is an email application, application 206 is an internet browsing application, and application 410 is a messaging application, then launching application 410 will replace application 204 because the email and messaging applications are in the same category (e.g., messaging category), and application 206/406 will be maintained because internet browsing applications and messaging categories are different categories. Additionally or alternatively, being of a same type of application may include being developed by a same application developer, being of a same age rating, being sold by a same seller, and/or being of a same application size. For example, if application 204 is developed by entity A, application 206 is developed by entity B, and application 410 is developed by entity A, then launching application 410 will replace application 204 because application 204 and application 410 are developed by the same entity, and application 406 will be maintained because application 406 and application 410 are developed by different entities. It should be understood that the above examples of characteristics are examples, but that other characteristics may be used to determine whether to cease or maintain display of a previously launched application with shared or different characteristics.

As described herein, in some such embodiments, a second type of selection input, different than a first type of selection input, can be used to launch an application in the three-dimensional environment in a second manner, different from the first manner corresponding to the first type of selection input.

Figure 5:
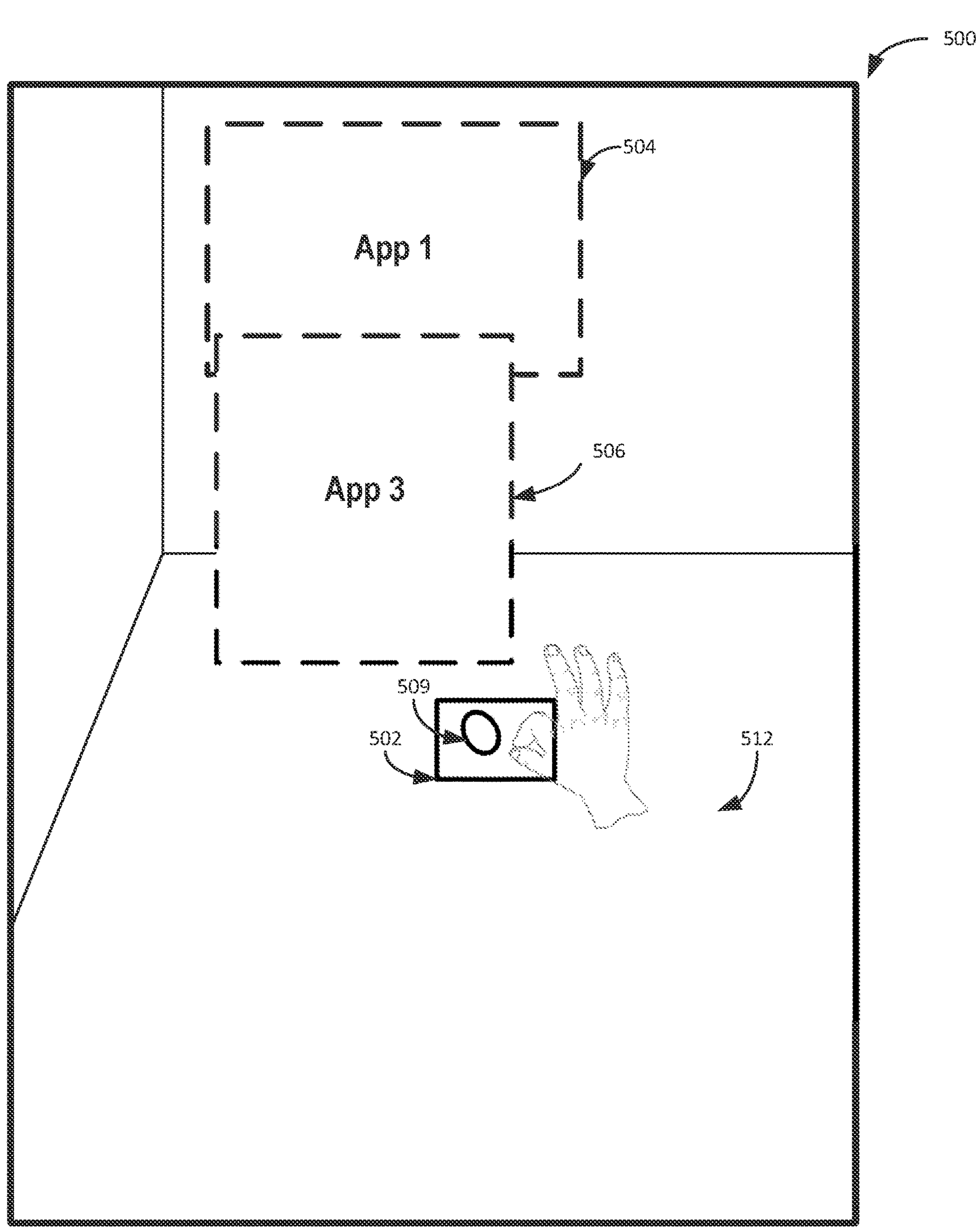
FIG. 5 illustrates selecting a representation of an application for launch in a three-dimensional environment according to embodiments of the disclosure.

FIG. 5 illustrates selecting a representation of an application for launch in a three-dimensional environment according to embodiments of the disclosure. Similar to FIG. 2 and without repeating all of the details for the sake of brevity, FIG. 5 illustrates a three-dimensional environment 500 (e.g., corresponding to three-dimensional environment 200). In some embodiments, three-dimensional environment 500 may display previously launched applications, such as applications 504 and/or 506 (e.g., corresponding to applications 204/206), and at least one representation 502 (e.g., a user interface element such as icon corresponding to representation 202) that is selectable to launch a respective application corresponding to representation 502 in the three-dimensional environment 500.

In some embodiments, a new application is launched using a selection input of the second type targeting representation 502 that is received via the one or more input devices in a similar manner as was described with reference to FIG. 2. In some embodiments, when no previously launched applications are displayed in the three-dimensional environment 500, the electronic device may launch the application corresponding to the representation targeted by the selection input (in a similar or the same manner as described above for the first selection type). In some embodiments, the selection input of the second type may be received while displaying one or more previously launched applications, including a first application (e.g., application 504) in the three-dimensional environment 500, and optionally displaying a third application (e.g., application 506).

In some embodiments, a selection input targeting representation 502 may correspond to a hand 512 performing a hand gesture, such as a tapping gesture, button press, pinching gesture for less than a threshold period of time (e.g., using proximity or gaze for targeting), tap and hold gesture, button press and hold, pinching gesture for greater than a threshold amount of time (e.g., a pinch and release after hold the pinching for greater than the threshold amount), or the like, but different than the input chosen for the first type of selection input. In some embodiments, the selection input may target representation 502 by bringing hand 512 or a representation of hand 512 in contact with or proximity to (e.g., within a threshold distance of) representation 502 as represented by target 509. For example, representation 502 may be targeted by a thumb and index finger or a representation of the thumb and index finger of hand 512 pinching (and holding) representation 502 at or near the location of target 509. In some embodiments, representation 502 is targeted using eye focus (gaze) and the selection input includes a pinch and hold gesture or another suitable gesture (different than the first type of selection gesture) at a distance from representation 502. In some embodiments, hand 512 may perform the second type of selection input using a pinch and hold gesture targeting representation 502 for more than a specified threshold period of time (e.g., 0.1, 0.3, 0.5, 1, 1.5, 3 seconds, etc.).

Figure 6:
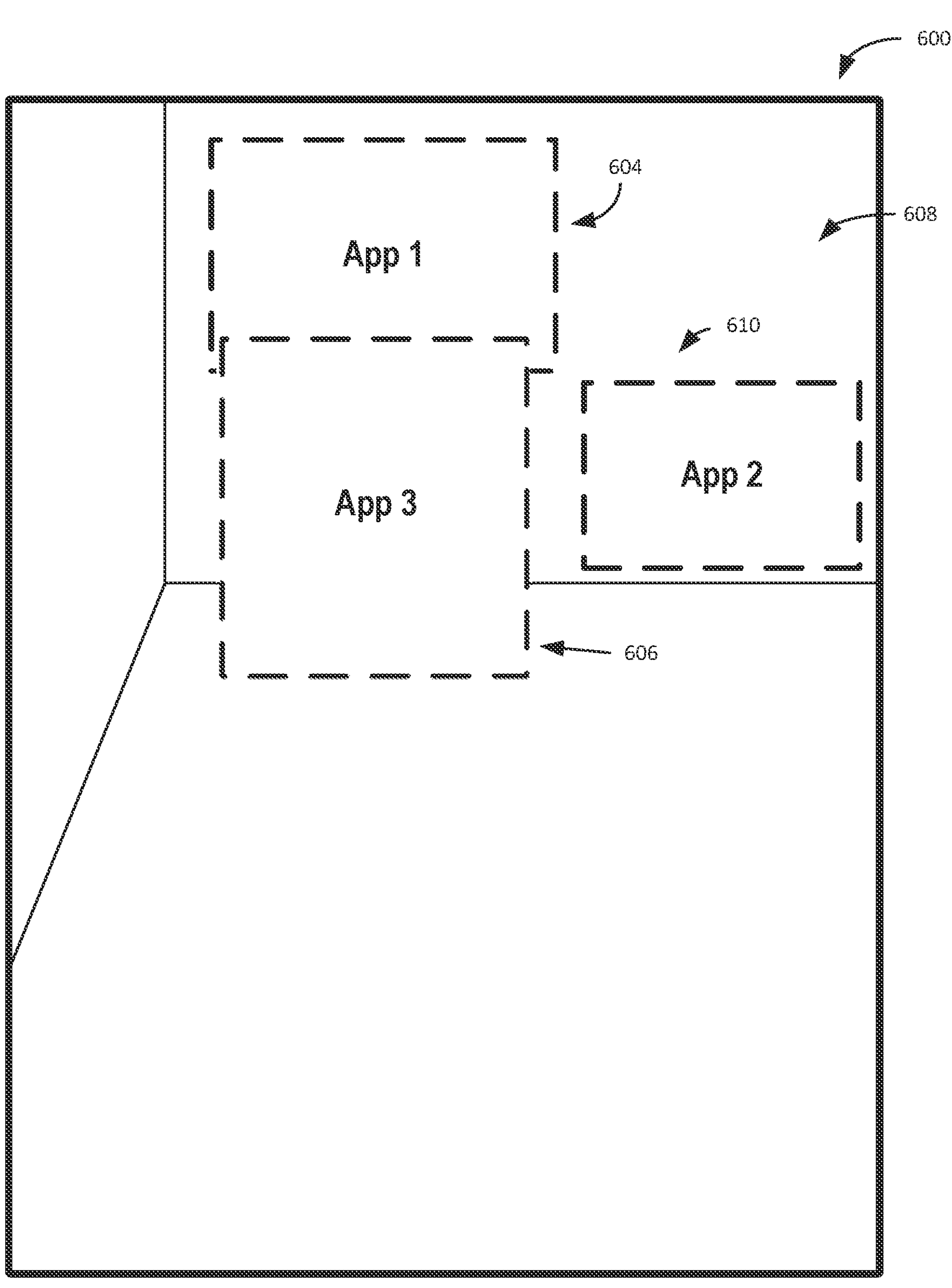
FIG. 6 illustrates launch of an application in response to receiving a selection input of a second type according to embodiments of the disclosure.

FIG. 6 illustrates launch of an application in response to receiving a selection input of a second type according to embodiments of the disclosure. In some embodiments, the second type of selection input may correspond to a tapping gesture, button press, pinching gesture for less than a threshold period of time (e.g., using proximity or gaze for targeting), tap and hold gesture, button press and hold, a pinching gesture for more than a threshold period of time (e.g., using proximity or gaze for targeting), or the like. As illustrated in FIG. 6, an application 610—the application corresponding to representation 502 targeted by the second type of selection input—may be launched in the three-dimensional environment 600 (e.g., a three-dimensional environment similar to three-dimensional environment 500).

In some embodiments, when the selection input is determined to be of a second type, the application 610 (e.g., the second application) corresponding to the selected representation 502 is launched into the three-dimensional environment and the one or more previously launched applications (e.g., previously launched applications such as application 504 and 506) may continue to be displayed in the three-dimensional environment, as illustrated in FIG. 6 (rather than ceasing to be displayed as described with reference to FIG. 3 when the selection input is of the first type). For example, if the selection input of the second type was received while displaying application 504, then application 610 (e.g., the application corresponding to the selected representation 502) may be launched in the three-dimensional environment 600 while the display of the first application 604 (e.g., corresponding to first application 504 in FIG. 5) is maintained in the three-dimensional environment 600. If the selection input of the second type was received while displaying application 504 and application 506, then application 610 (e.g., the application corresponding to the selected representation 502) may be launched in the three-dimensional environment 600 while the display of application 604 (e.g., corresponding to application 504 in FIG. 5) and application 606 (e.g., corresponding to application 506 in FIG. 5) is maintained in the three-dimensional environment 600.

In some embodiments, upon release of a selection gesture of a second type (e.g., upon release of a pinch and hold gesture), application 610 may be automatically launched at an open location in three-dimensional environment 600 (e.g., in a region of the three-dimensional environment without real and/or virtual objects). In some embodiments, the system may want to launch the application in a first area of the three-dimensional environment 600 based on the launch conditions (e.g., based on characteristics of the environment and/or based on characteristics of the application to be launched application and/or based on characteristics of the input). The system may determine when launching application 610 that the first area of the three-dimensional environment 600 is occupied by physical and/or virtual objects such that the first area is unable to display application 610. In some such examples, application 610 may be launched in a second area of the three-dimensional environment, different than the first area, that can display the application (e.g., an open area of a wall). In some such embodiments, the system can launch application 610 in the first area and the real world and/or virtual objects can be obscured and/or relocated at least partially from the first area. For example, real world and/or virtual objects currently displayed in the first area may be occluded. In some embodiments, virtual objects can be relocated (e.g., pushed fully or partially outside of the first area) to make space for application 610. For example, if applications 604 and 606 are currently occupying most or all of an area that application 610 is attempting to launch in, applications 604 and 606 may shifted out of the area to allow for the display of application 610.

In some embodiments, the input received by the one or more input devices may include movement input in addition to a selection input. In some embodiments, a hand or a representation of a hand (e.g., hand 512) may perform a selection input of a second type (e.g., a pinch and hold gesture for more than a threshold period of time) targeting a representation (e.g., representation 502), and may also perform a movement input requesting to move the selected representation to a location in the three-dimensional environment.

Figure 7:
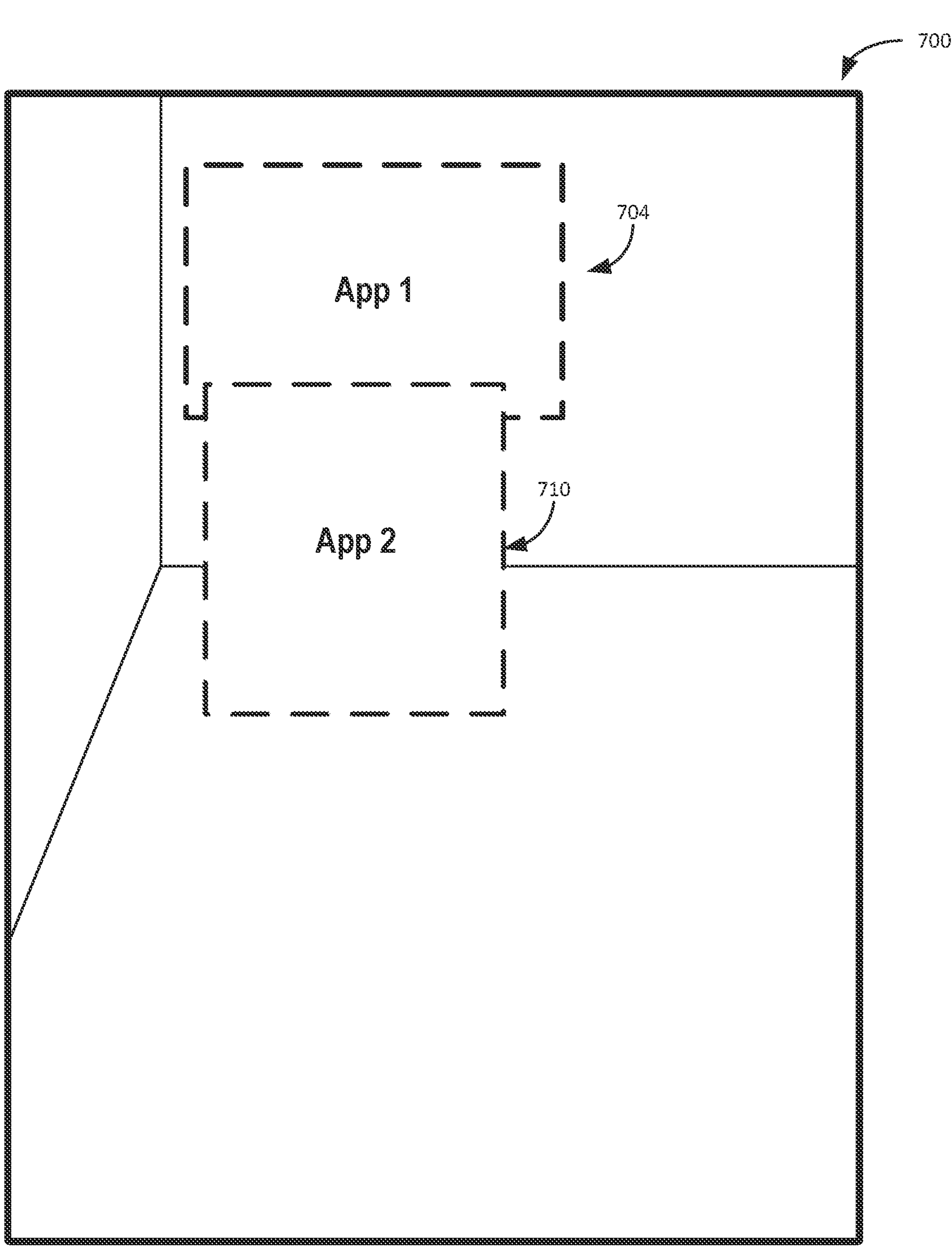
FIG. 7 illustrates launch of an application in response to receiving the selection input of a second type and a movement input according to embodiments of the disclosure.

Although FIG. 6 illustrates launch of an application 610 while maintaining display of previously launched applications, in some embodiments, when a selection input of a second type is received, some of the previously launched applications may cease to be displayed in the three-dimensional environment. FIG. 7 illustrates launch of an application in response to receiving the selection input of a second type and a movement input according to embodiments of the disclosure. In some embodiments, when the input includes a selection input of the second type and a movement input that moves the selected representation to be at or in proximity to (e.g., within a threshold distance of) a previously launched application, the launch of the new application corresponding to the representation can include replacing the previously launched application at or in proximity to the representation at the time of release. For example, as illustrated in FIG. 7, in response to moving representation 502 to be at or in proximity of application 506, application 710 may be launched in three-dimensional environment 700 (e.g., a three-dimensional environment similar to three-dimensional environment 500, 600) and replace the display of application 506 in the three-dimensional environment.

In some embodiments, when the input is determined to be a selection input of a second type and includes movement input targeting a location of a previously launched application such as third application 506 (e.g., moving representation 502 to a respective location at or near the third application 506 in the three-dimensional environment while holding a pinch selecting representation 502 and then releasing the pinch at the respective location), the application 710 (e.g., the second application) corresponding to the selected representation 502 is launched into the three-dimensional environment replacing the co-located previously launched application (e.g., third application 506). Other previously launched applications (e.g., previously launched applications such as application 504) may continue to be displayed in the three-dimensional environment. For example, as illustrated in FIG. 7, display of the first application 704 (e.g., corresponding to first application 504 in FIG. 5) is maintained in the three-dimensional environment 600.

In some embodiments, when movement input does not target the location of a previously launched application (e.g., moving representation 502 to a respective location a threshold distance away from the third application 506 at the time of releasing the pinch and hold), the application 710 is launched in the three-dimensional environment without replacing the display of any currently displayed applications in the three-dimensional environment (e.g., as shown in and described with respect to FIG. 6).

In some embodiments, when moving the representation to be at or in proximity to a previously launched application and upon release of the selected representation, the application corresponding to the selected representation may not replace the display of the previously launched application. For example, if the selected representation is moved to be at or in proximity to application 506, upon releasing of the selected representation, application 710 may not replace the display of application 506, but rather cause application 506 to be pushed or shifted to a different location in the three-dimensional environment. After application 506 has moved to a different location, application 710 may then be displayed at the location in the three-dimensional environment indicated position of the selected representation upon release.

It should be understood that the although the first and second selection types are described primarily in terms of a brief pinch and release and a pinch and hold (optionally with motion) that the first and second selection types may be invoked with different gestures or inputs received via the input devices.

Figure 8:
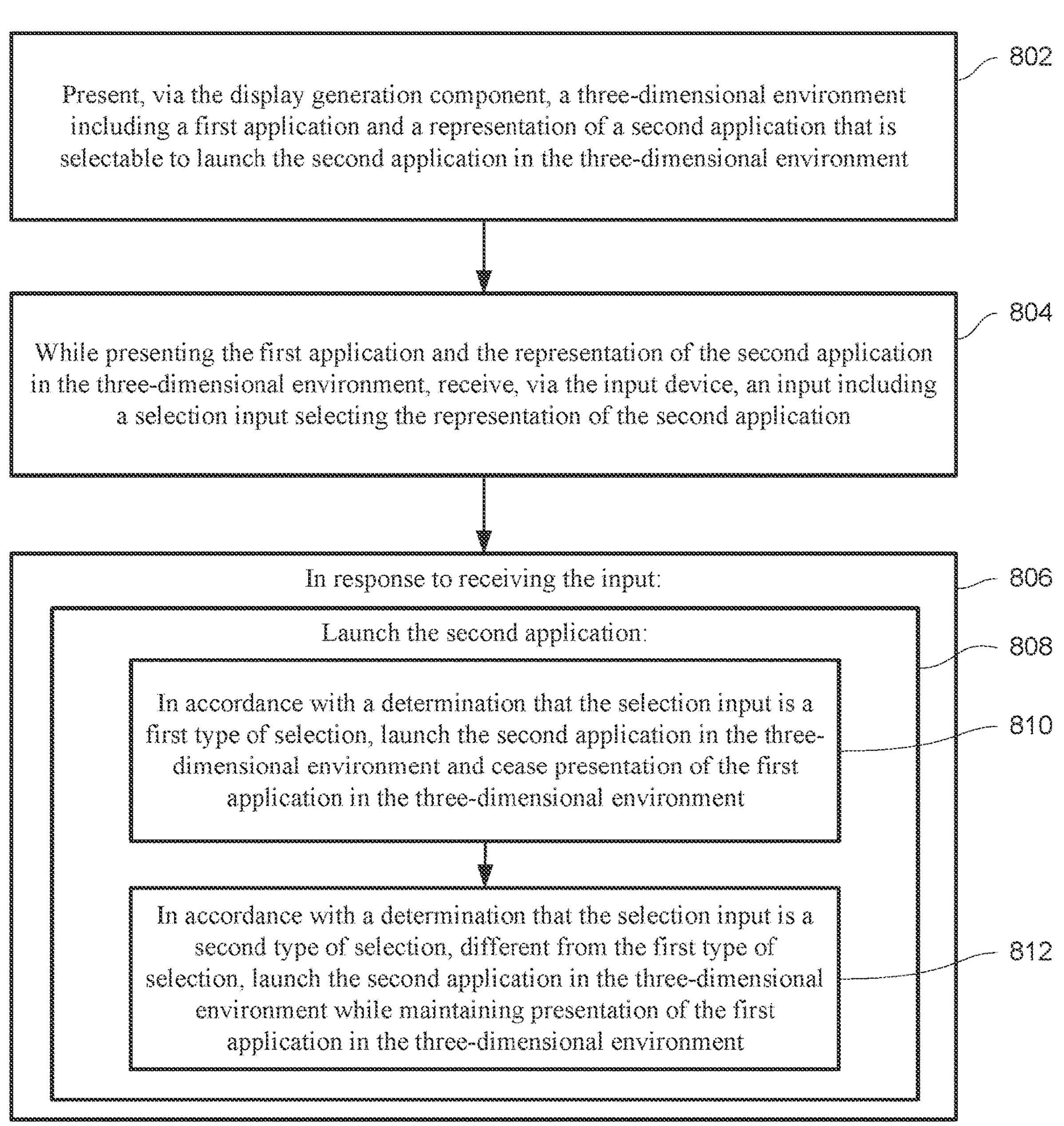
FIG. 8 is a flow diagram illustrating a method of launching an application in a three-dimensional environment according to embodiments of the disclosure.

FIG. 8 is a flow diagram illustrating a method 800 of launching an application in a three-dimensional environment in accordance with some embodiments of the disclosure. The method 800 is optionally performed at an electronic device such as device 100, as described above with references to FIGS. 1-7. Some operations in method 800 are, optionally combined and/or the order of some operations is, optionally, changed. As described below, the method 800 provides methods for launching an application in a three-dimensional environment (e.g., as discussed with FIGS. 2-7).

In some embodiments, method 800 is performed by an electronic device in communication with a display generation component and an input device (e.g., a mobile device (e.g., a tablet, a smartphone, a media player), a computer (e.g., a desktop computer, a laptop computer), or a wearable device (e.g., a watch, a head-mounted device). In some embodiments, the display generation component is a display integrated with the electronic device (optionally a touch screen display) and/or an external display such as a monitor, projector, television, etc.).

In some embodiments, the electronic device presents (802), via the display generation component, a three-dimensional environment that includes a first application and a representation of a second application that is selectable to launch the second application in the three-dimensional environment, such as application 204 and representation 202 described with reference to and illustrated in FIG. 2.

In some embodiments, while presenting the first application and the representation of the second application in the three-dimensional environment, the electronic device receives (804), via the input device, an input including a selection input selecting the representation of the second application. For example, in FIG. 2, the electronic device 100 detects that hand 212 is performing a selection gesture to select representation 202 (as indicated by target 209), and in FIG. 5, the electronic device 100 detects that hand 512 is performing a selection gesture to selection representation 502 (as indicated by target 509).

In some embodiments, in response to receiving the input (806): the electronic device launches (808) the second application, and in accordance with a determination that the selection input is a first type of selection, the electronic device launches (810) the second application in the three-dimensional environment and ceases (810) presentation of the first application in the three-dimensional environment. For example, in FIG. 3, in response to detecting that hand 212 performed the first type of selection (e.g., a tapping gesture, button press, pinching gesture for less than a threshold period of time (e.g., using proximity or gaze for targeting), tap and hold gesture, button press and hold, pinching gesture for more than a threshold period of time, or the like), the electronic device launches application 310 in the three-dimensional environment 300, and the electronic devices 100 ceases presentation of application 204 in the three-dimensional environment.

In some embodiments, in response to receiving the input (806): the electronic device launches (808) the second application, and in accordance with a determination that the selection input is a second type of selection, different from the first type of selection, the electronic device 100 launches (812) the second application in the three-dimensional environment while maintaining presentation of the first application in the three-dimensional environment. For example, in FIG. 6, in response to detecting that hand 512 performed a second type of selection (e.g., a tapping gesture, button press, pinching gesture for less than a threshold period of time (e.g., using proximity or gaze for targeting), tap and hold gesture, button press and hold, a pinching gesture for more than a threshold period of time (e.g., using proximity or gaze for targeting), or the like (but different than the first type of selection input)), the electronic device 100 launches the second application 610 in the three-dimensional environment while maintaining presentation of application 604 in the three-dimensional environment.

Additionally or alternatively, in some embodiments, the three-dimensional environment further includes a third application, and the input is received while presenting the third application. For example, in FIG. 2, application 206 is optionally presented in the three-dimensional environment 200, and while presenting application 206, the electronic device optionally detects hand 212 selecting representation 202; in FIG. 5, application 506 is optionally presented in the three-dimensional environment 500, and while presenting application 506, the electronic device optionally detects hand 512 selecting representation 502. In some embodiments, method 800 further comprises, in response to receiving the input and in accordance with the determination that the input is the first type of selection input, the electronic device ceases presentation of the third application in the three-dimensional environment. For example, in FIG. 3, in response to detecting that hand 212 selected representation 202 with a first type of selection input, the electronic device 100 launches application 310 in the three-dimensional environment, and the electronic device 100 ceases presentation of application 204 and 206 in the three-dimensional environment. In some embodiments, method 800 further comprises, in response to receiving the input and in accordance with the determination that the input is the second type of selection input, the electronic device 100 maintains presentation of the third application in the three-dimensional environment. For example, in FIG. 6, in response to detecting that hand 512 selected representation 502 with a second type of selection input, the electronic device 100 launches application 610 in the three-dimensional environment and maintains presentation of application 504 and 506 in the three-dimensional environment.

Additionally or alternatively, in some embodiments, the method 800 further comprises, in response to receiving the input, in accordance with a determination that the input is the first type of selection input, and in accordance with a determination that the second application and the first application share a first characteristic, and that the third application does not have the first characteristic, the electronic device ceases presentation of the first application in the three-dimensional environment while maintaining presentation of the third application in the three-dimensional environment. For example, in FIG. 4, in response to detecting hand 212 selected representation 202 with a first type of selection, determining that application 410 and application 204 share a first characteristic; and determining that application 206/406 do not share the first characteristic, the electronic device 100 ceases presentation of application 204 in the three-dimensional environment and maintains presentation of application 406 in the three-dimensional environment.

Additionally or alternatively, in some embodiments, the first characteristic shared by the first application and the second application includes that a launch location of the second application in the three-dimensional environment is within a threshold distance of the first application in the three-dimensional environment. For example, application 204 and application 410 share a first characteristic, if the launch location of application 410 in the three-dimensional environment is within a threshold distance of application 204 in the three-dimensional environment.

Additionally or alternatively, in some embodiments, the first characteristic shared by the first application and the second application includes being of a same type of application. For example, application 204 and application 410 share a first characteristic if the applications are of a same application category (e.g., application categories such as messaging, social networking, entertainment, health and fitness, music, travel, photo and video, sports, finance, or the like). Additionally or alternatively, application 204 and application 410 are, optionally, of a same type of application if the applications are developed by a same application developer, are of a same age rating, are sold by a same seller, and/or are of a same application size.

Additionally or alternatively, in some embodiments, the input further includes a movement input that moves the representation of the second application within a threshold distance of the third application in the three-dimensional environment. For example, in FIG. 5, the electronic device 100 detects the input of hand 512 selecting representation 502 and the input of hand 512 moving representation 502 within a threshold distance of application 506. In some embodiments, method 800 further comprises, in response to receiving the input: in accordance with a determination that the selection input is the second type of selection input, the electronic device replaces the presentation of the third application with the presentation of the second application in the three-dimensional environment. For example, in FIG. 6, in response to hand 512 selecting representation 502 and moving representation 502 within a threshold distance of application 506, the electronic device replaces the presentation of application 506 with the presentation of application 710.

Additionally or alternatively, in some embodiments, the first type of selection input includes a pinching input for less than a first time threshold, and the second type of selection input includes a pinching input for more than the first time threshold, such as in FIG. 2 and FIG. 5, respectively. Additionally or alternatively, in some embodiments, the first type of selection input includes a tap input (e.g., a tap for less than a first time threshold) and the second type of selection input includes a tap and hold input (e.g., a tap for more than the first time threshold). Additionally or alternatively, in some embodiments, the first type of selection input includes a button press input (e.g., a button press for less than a first time threshold) and the second type of selection input includes a button press and hold input (e.g., a button press for more than the first time threshold). It is understood that other inputs are possible for the first and second types of selection inputs.

It should be understood that, in some embodiments, all the content displayed in an XR environment is virtual content. In some embodiments, the XR environment includes representations of the real-world environment (e.g., provided by image sensors and passed through to the display) and/or virtual content. In some embodiments, the XR environment may be presented to the user via an at least partially transparent display in which the real-world environment is visible (without computer-generation) and in which virtual content is displayed via the display. As used herein, presenting an environment includes presenting a real-world environment (e.g., optical pass-though), presenting a representation of a real-world environment (e.g., displaying video-pass though via a display generation component), and/or presenting a virtual environment (e.g., displaying via a display generation component). Virtual content (e.g., user interfaces, content items, etc.) can also be presented with these environments (e.g., displayed via a display generation component). It is understood that as used herein the terms "presenting"/"presented" and "displaying"/"di splayed" are often used interchangeably, but depending on the context it is understood that when a real world environment is visible to a user without being generated by the display generation component, such a real world environment is "presented" to the user and not necessarily technically "displayed" to the user.

Additionally or alternatively, as used herein, the singular forms "a," "an," and "the" are intended to include the plural forms, unless the context clearly indicates otherwise. The term "and/or" as used herein refers to and encompasses any and all possible combinations of one or more of the associated listed items. The terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Further, although the above description uses terms "first," "second," etc. to describe various elements, these elements should not be limited by the terms. These terms are only used to distinguish one element from another. For example, a respective selection input could be referred to as a "first" or "second" selection input, without implying that the respective selection input has different characteristics based merely on the fact that the respective selection input is referred to as a "first" or "second" selection input. On the other hand, a selection input referred to as a "first" selection input and a selection input referred to as a "second" selection input are both selection input, but are not the same selection input, unless explicitly described as such.

Additionally or alternatively, as described herein, the term "if," optionally, means "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context. The terminology used in the description of the various described embodiments herein is for the purpose of describing particular embodiments only and is not intended to be limiting.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device in communication with a display and an input device:

presenting, via the display, a three-dimensional environment that is an extended reality environment including a first application and a representation of a second application that is selectable to launch the second application in the three-dimensional environment;

while presenting the first application and the representation of the second application in the three-dimensional environment, receiving, via the input device, an input including a selection input selecting the representation of the second application;

in response to receiving the input:

launching the second application, wherein:

in accordance with a determination that the selection input is a first type of selection, launching the second application in the three-dimensional environment and ceasing presentation of the first application in the three-dimensional environment; and in accordance with a determination that the selection input is a second type of selection, different from the first type of selection, launching the second application in the three-dimensional environment while maintaining presentation of the first application in the three-dimensional environment.

2. The method of claim 1, wherein the three-dimensional environment further includes a third application and wherein the input is received while presenting the third application, the method further comprising:

in response to receiving the input:

in accordance with the determination that the input is the first type of selection input, ceasing presentation of the third application in the three-dimensional environment; and in accordance with a determination that the input is the second type of selection input, maintaining presentation of the third application in the three-dimensional environment.

3. The method of claim 1, wherein the three-dimensional environment further includes a third application and wherein the input is received while presenting the third application, the method further comprising:

in response to receiving the input:

in accordance with a determination that the input is the first type of selection input:

in accordance with a determination that the second application and the first application share a first characteristic and the third application does not have the first characteristic, ceasing presentation of the first application in the three-dimensional environment while maintaining presentation of the third application in the three-dimensional environment.

4. The method of claim 3, wherein the first characteristic shared by the first application and the second application includes a launch location of the second application in the three-dimensional environment being within a threshold distance of the first application in the three-dimensional environment.

5. The method of claim 3, wherein the first characteristic shared by the first application and the second application includes being of a same type of application.

6. The method of claim 1, wherein the three-dimensional environment further includes a third application, wherein the input is received while presenting the third application, and wherein the input further includes a movement input that moves the representation of the second application within a threshold distance of the third application in the three-dimensional environment, the method further comprising:

in response to receiving the input:

in accordance with a determination that the selection input is the second type of selection input, replacing the presentation of the third application with the presentation of the second application in the three-dimensional environment.

7. The method of claim 1, wherein:

the first type of selection input includes a pinching input for less than a first time threshold; and the second type of selection input includes a pinching input for more than the first time threshold.

8. The method of claim 1, wherein:

the first type of selection input includes a tap input; and the second type of selection input includes a tap and hold input.

9. The method of claim 1, wherein:

the first type of selection input includes a button press input; and the second type of selection input includes a button press and hold input.

10. The method of claim 1, further comprising:

in response to receiving the input:

in accordance with the determination that the selection input is the first type of selection, ceasing presentation of a representation of the first application in the three- dimensional environment.

11. The method of claim 1, further comprising:

presenting, via the display, the three-dimensional environment including the first application and a plurality of representations of applications selectable to launch corresponding applications, the plurality of representations including the representation of the second application; and in response to receiving the input:

ceasing presentation of the plurality of representations.

12. A non-transitory computer-readable storage medium storing instructions, which when executed by one or more processors of an electronic device, cause the electronic device to perform a method comprising:

presenting, via a display, a three-dimensional environment that is an extended reality environment including a first application and a representation of a second application that is selectable to launch the second application in the three-dimensional environment;

while presenting the first application and the representation of the second application in the three-dimensional environment, receiving, via an input device, an input including a selection input selecting the representation of the second application;

in response to receiving the input:

launching the second application, wherein:

in accordance with a determination that the selection input is a first type of selection, launching the second application in the three-dimensional environment and ceasing presentation of the first application in the three-dimensional environment; and in accordance with a determination that the selection input is a second type of selection, different from the first type of selection, launching the second application in the three-dimensional environment while maintaining presentation of the first application in the three-dimensional environment.

13. The non-transitory computer-readable storage medium of claim 12, wherein the three-dimensional environment further includes a third application and wherein the input is received while presenting the third application, the method further comprising:

in response to receiving the input:

in accordance with the determination that the input is the first type of selection input, ceasing presentation of the third application in the three-dimensional environment; and in accordance with a determination that the input is the second type of selection input, maintaining presentation of the third application in the three-dimensional environment.

14. The non-transitory computer-readable storage medium of claim 12, wherein the three-dimensional environment further includes a third application and wherein the input is received while presenting the third application, the method further comprising:

in response to receiving the input:

in accordance with a determination that the input is the first type of selection input:

in accordance with a determination that the second application and the first application share a first characteristic and the third application does not have the first characteristic, ceasing presentation of the first application in the three-dimensional environment while maintaining presentation of the third application in the three-dimensional environment.

15. The non-transitory computer-readable storage medium of claim 14, wherein the first characteristic shared by the first application and the second application includes a launch location of the second application in the three-dimensional environment being within a threshold distance of the first application in the three-dimensional environment.

16. The non-transitory computer-readable storage medium of claim 14, wherein the first characteristic shared by the first application and the second application includes being of a same type of application.

17. The non-transitory computer-readable storage medium of claim 12, wherein the three-dimensional environment further includes a third application, wherein the input is received while presenting the third application, and wherein the input further includes a movement input that moves the representation of the second application within a threshold distance of the third application in the three-dimensional environment, the method further comprising:

in response to receiving the input:

in accordance with a determination that the selection input is the second type of selection input, replacing the presentation of the third application with the presentation of the second application in the three-dimensional environment.

18. The non-transitory computer-readable storage medium of claim 12, wherein:

the first type of selection input includes a pinching input for less than a first time threshold; and the second type of selection input includes a pinching input for more than the first time threshold.

19. The non-transitory computer-readable storage medium of claim 12, wherein:

the first type of selection input includes a tap input; and the second type of selection input includes a tap and hold input.

20. The non-transitory computer-readable storage medium of claim 12, wherein:

the first type of selection input includes a button press input; and the second type of selection input includes a button press and hold input.

21. An electronic device comprising:

one or more processors; and memory storing instructions, which when executed by the one or more processors, cause the electronic device to perform a method comprising:

presenting, via a display, a three-dimensional environment that is an extended reality environment including a first application and a representation of a second application that is selectable to launch the second application in the three-dimensional environment;

while presenting the first application and the representation of the second application in the three-dimensional environment, receiving, via an input device, an input including a selection input selecting the representation of the second application;

in response to receiving the input:

launching the second application, wherein:

in accordance with a determination that the selection input is a first type of selection, launching the second application in the three-dimensional environment and ceasing presentation of the first application in the three-dimensional environment; and in accordance with a determination that the selection input is a second type of selection, different from the first type of selection, launching the second application in the three-dimensional environment while maintaining presentation of the first application in the three-dimensional environment.

22. The electronic device of claim 21, wherein the three-dimensional environment further includes a third application and wherein the input is received while presenting the third application, the method further comprising:

in response to receiving the input:

in accordance with the determination that the input is the first type of selection input, ceasing presentation of the third application in the three-dimensional environment; and in accordance with a determination that the input is the second type of selection input, maintaining presentation of the third application in the three-dimensional environment.

23. The electronic device of claim 21, wherein the three-dimensional environment further includes a third application and wherein the input is received while presenting the third application, the method further comprising:

in response to receiving the input:

in accordance with a determination that the input is the first type of selection input:

in accordance with a determination that the second application and the first application share a first characteristic and the third application does not have the first characteristic, ceasing presentation of the first application in the three-dimensional environment while maintaining presentation of the third application in the three-dimensional environment.

24. The electronic device of claim 23, wherein the first characteristic shared by the first application and the second application includes a launch location of the second application in the three-dimensional environment being within a threshold distance of the first application in the three-dimensional environment.

25. The electronic device of claim 23, wherein the first characteristic shared by the first application and the second application includes being of a same type of application.

26. The electronic device of claim 21, wherein the three-dimensional environment further includes a third application, wherein the input is received while presenting the third application, and wherein the input further includes a movement input that moves the representation of the second application within a threshold distance of the third application in the three-dimensional environment, the method further comprising:

in response to receiving the input:

in accordance with a determination that the selection input is the second type of selection input, replacing the presentation of the third application with the presentation of the second application in the three-dimensional environment.

27. The electronic device of claim 21, wherein:

the first type of selection input includes a pinching input for less than a first time threshold; and the second type of selection input includes a pinching input for more than the first time threshold.

28. The electronic device of claim 21, wherein:

the first type of selection input includes a tap input; and the second type of selection input includes a tap and hold input.

29. The electronic device of claim 21, wherein:

the first type of selection input includes a button press input; and the second type of selection input includes a button press and hold input.

* * * * *